United States Patent [19]

Bacha et al.

[11] 3,903,179

[45] Sept. 2, 1975

[54] METHOD FOR PREPARING NITROCYCLOPROPANE FROM 3-CHLORO-1-NITROPROPANE

[75] Inventors: John D. Bacha; Charles M. Selwitz, both of Monroeville, Pa.

[73] Assignee: Gulf Research & Development Company, Pittsburgh, Pa.

[22] Filed: Oct. 15, 1973

[21] Appl. No.: 406,309

[52] U.S. Cl. ............................................. 260/644
[51] Int. Cl.² ........................................ C07C 79/08
[58] Field of Search ................................., 260/644

[56] References Cited
OTHER PUBLICATIONS

Rodd's Chemistry of Carbon Compounds, S. Coffey, Editor, 2nd Ed., Vol. II, Part A, Elsevier Pub. Co., London, 1964, p. 45.

*Primary Examiner*—Leland A. Sebastian

[57] ABSTRACT

Nitrocyclopropane is prepared by reacting 3-chloro-1-nitropropane with anhydrous ammonia in the presence of a polar, aprotic solvent. For example, the reaction of 3-chloro-1-nitropropane with anhydrous ammonia in the presence of dimethyl sulfoxide produces nitrocyclopropane in high yield.

9 Claims, No Drawings

METHOD FOR PREPARING NITROCYCLOPROPANE FROM 3-CHLORO-1-NITROPROPANE

This invention relates to a method of making nitrocyclopropane. More particularly, this invention relates to a method of making nitrocyclopropane in good yield by the reaction of 3-chloro-1-nitropropane with anhydrous ammonia in the presence of a polar, aprotic solvent.

Nitrocyclopropane has been made in low yield by the direct nitration of cyclopropane. Nitrocyclopropane has also been made as described in U.S. Pat. Nos. 3,100,805 and 3,100,806 by the ring closure of 3-iodo-1-nitropropane. In the procedure described in these patents, initially prepared 3-chloro-1-nitropropane must be converted to 3-iodo-1-nitropropane using an excess of sodium iodide. These patents state that 3-chloro-1-nitropropane submits to ring closure only with 10 per cent yield under the best conditions.

We have discovered, as described in our copending application, Ser. No. 329,566, now U.S. Pat. No. 3,769,355, that 3-chloro-1-nitropropane can be converted at high yield to nitrocyclopropane in a single step by the reaction of 3-chloro-1-nitropropane with a suitable base in the presence of a polar, aprotic solvent. In this earlier application we specified ammonium hydroxide as one of the many bases suitable for the reaction, but we omitted anhydrous ammonia because we did not believe that it would be effective in the reaction. For example, anhydrous ammonia is a substantially weaker base than the specified alkyl amines, yet some of these are only moderately effective. Also, we did not believe that the gaseous anhydrous ammonia (b.p. −33.5°C.) would be sufficiently soluble in the solvent at the temperature of reaction. Further, we have found that anhydrous ammonia is ineffective as the base in the reactions described in copending applications Ser. No. 329,567, now U.S. Pat. No. 3,769,356, and Ser. No. 329,568, now U.S. Pat. No. 3,769,357, in which nitromethane, vinyl bromide or a 1,2-dihaloethane, a base including ammonium hydroxide and a polar, aprotic solvent are utilized.

For these reasons, it was highly unexpected to us to discover that not only is anhydrous ammonia an effective base in the reaction with 3-chloro-1-nitropropane in a polar, aprotic solvent but, in addition, it was highly surprising to discover that anhydrous ammonia is even more effective than ammonium hydroxide in this reaction. Rapid reaction was found to be accompanied by the formation of a good yield of nitrocyclopropane. With due consideration of cost, effectiveness and ease of handling, anhydrous ammonia was found to be superior to ammonium hydroxide as well as every amine that was examined.

Useful polar, aprotic solvents include the sulfoxides, the sulfones, the di-N-substituted carboxylic acid amines, the N-substituted pyrrolidones, and the like. The sulfoxides are defined by the formula $R_1(R_2)S{:}O$ in which $R_1$ and $R_2$ are independently selected from lower alkyl, phenyl and benzyl and chlorine substituted derivatives thereof. Dimethyl sulfoxide is the preferred sulfoxide. Also useful are diethyl sulfoxide, di-n-propyl sulfoxide, di-n-butyl sulfoxide, di-2-chloroethyl sulfoxide, diphenyl sulfoxide, methyl phenyl sulfoxide, benzyl phenyl sulfoxide, dibenzyl sulfoxide, and the like. The sulfones are defined by the formula $R_3(R_4)SO_2$ in which $R_3$ and $R_4$ are independently selected from lower alkyl and can be joined together to form a cyclic compound having from three to eight members in the ring. Sulfolane also known as tetramethylene sulfone is the preferred sulfone. Also useful are dimethyl sulfone, diethyl sulfone, trimethylene sulfone, pentamethylene sulfone, hexamethylene sulfone, and the like.

The di-N-substituted carboxylic acid amides are defined by the formula $R_5CONR_6(R_7)$ in which $R_5$ is hydrogen or lower alkyl and $R_6$ and $R_7$ are independently lower alkyl. Preferred di-N-substituted carboxylic acid amides are dimethyl formamide and dimethyl acetamide. Also useful are diethyl formamide, diethyl acetamide, di-n-propyl acetamide, di-t-butyl acetamide, dimethyl butyramide, dimethyl propionamide, and the like. The useful N-substituted pyrrolidones include the N-lower alkyl alpha and beta pyrrolidones. Preferred are N-methyl pyrrolidone and N-ethyl pyrrolidone. Other polar, aprotic solvents are useful herein such as hexamethylenephosphoramide and the like. As used herein, lower alkyl includes alkyl groups having from one to about four carbon atoms. Suitable mixtures of two or more polar, aprotic solvents can also be used. Common solvents such as acetone, acetonitrile, and methylene chloride were found to be unsatisfactory as a reaction solvent.

The reaction of the anhydrous ammonia with the 3-chloro-1-nitropropane is a liquid phase reaction carried out in the polar, aprotic solvent. For this reason, the reaction is carried out under conditions which insure that dissolved anhydrous ammonia is present in the polar, aprotic solvent. This can suitably be accomplished by bubbling sufficient anhydrous ammonia gas through a solution of the 3-chloro-1-nitropropane in the polar, aprotic solvent to effect reaction. Or a solution of 3-chloro-1-nitropropane in the polar, aprotic solvent and a solution, preferably saturated, of the anhydrous ammonia in the polar, aprotic solvent can be added, one to the other, stepwise, if desired, to aid in temperature control of the exothermic reaction. The amount of anhydrous ammonia that can be dissolved in the polar, aprotic solvent at the reaction conditions came as a surprise to us.

The temperature for carrying out the reaction is not critical. At too low a temperature the reaction occurs at an impractical rate, while at too high a temperature, undesired decomposition as well as the substantially diminished solubility of the anhydrous ammonia in the solvent becomes important. Since the reaction rate increases as the temperature increases, an elevated temperature can in many instances be advantageously employed when the reaction vessel is pressured to increase the solubility of the anhydrous ammonia in the solvent. In view of these considerations, a broad temperature range of about 0° to about 160° C. is useful. However, we prefer a temperature within the range of about 15° to about 145° C. and most prefer a temperature within the range of about 25° to about 125° C. The reaction can be carried out at atmospheric pressure or at lower or higher pressures. We prefer to use atmospheric pressure at the lower temperatures and an elevated pressure, preferably autogenous pressure, at the higher temperatures.

The relative proportion of the 3-chloro-1-nitropropane, the anhydrous ammonia and the polar, aprotic solvent that is used is not critical to obtaining reaction. However, we have found that the reaction can be run at greater efficiency when the amount of these materials is controlled within specified ranges. Thus, we have found that a molar ratio of the anhydrous ammonia to the 3-chloro-1-nitropropane of about 0.5:1 to about 20:1 is desirable with a ratio of about 1:1 to about 10:1 being preferred. In like manner, we have found that a volume ratio of polar, aprotic solvent to 3-chloro-1-nitropropane of about 1:1 to about 100:1 is desirable with a volume ratio of about 5:1 to about 50:1 being preferred. Also we have found that a ratio of polar, aprotic solvent in liters to anhydrous ammonia in mols of about 0.01:1 to about 30:1 is desirable with about 0.1:1 to about 10:1 being preferred.

The reaction of the 3-chloro-1-nitropropane and the anhydrous ammonia in the polar, aprotic solvent can be conveniently carried out in a batch operation particularly when large quantities are not required. When conducted batchwise, it is preferred to carry out the reaction until substantially no 3-chloro-1-nitropropane is left in the reactor to avoid any need for reactant recovery and recycle steps. The reaction can also be carried out as a continuous reaction by introducing the reactants and the polar, aprotic solvent into an elongated reactor and maintaining the reaction temperature as the reaction mixture progresses to the outlet. In this continuous procedure the reaction can be carried out at partial conversion with somewhat improved efficiency and with recycle of unreacted 3-chloro-1-nitropropane. In the reaction, whether carried out as a batch or as a continuous reaction, some of the 3-chloro-1-nitropropane is converted to an unidentified by-product.

The following examples are set out to illustrate the novel process of the invention and to provide a better understanding of its details and advantages.

EXAMPLES 1–12

A solution of 16 mmols (2.0 grams) 3-chloro-1-nitropropane (CNP) in 70 ml. of dimethyl sulfoxide (DMSO) was prepared in a 100 ml. flask. Over a one hour period 111 mmols of anhydrous ammonia were bubbled through the solution with stirring. The temperature rose from 25° to 33° C. during the course of the reaction. The conversion of 3-chloro-1-nitropropane was 100 percent at a yield of 54.9 mol percent of nitrocyclopropane (NCP). A series of reactions were carried out using this procedure to observe the effects of temperature, amount of anhydrous ammonia, concentration of 3-chloro-1-nitropropane and the concentration of added ammonium chloride, which is a by-product of the reaction.

A second series (Examples 10–12) were carried out to observe any effects resulting from a different mode of addition. In this second procedure the 3-chloro-1-nitropropane in 20 ml. of dimethyl sulfoxide was added dropwise with stirring to a saturated solution of anhydrous ammonia dissolved in dimethyl sulfoxide. The results of these experiments are set out in Table I. In each example the conversion of 3-chloro-1-nitropropane was 100 percent.

Table I

| Ex. | DMSO, ml | CNP, mmols | DMSO/CNP ml/mmols | $NH_3$ mmols | $NH_4Cl$ mmols | Temp. °C. | Time, hours | NCP Mol % |
|---|---|---|---|---|---|---|---|---|
| 1 | 70 | 16 | 4.38 | 111 | — | 25–33 | 1.0 | 54.9 |
| 2 | 70 | 16 | 4.38 | 253 | — | 19–22 | 1.0 | 53.3 |
| 3 | 70 | 16 | 4.38 | 141 | — | 42–45 | 1.0 | 52.8 |
| 4 | 70 | 32 | 2.19 | 159 | — | 25–48 | 1.7 | 48.7 |
| 5 | 35 | 32 | 1.09 | 238 | — | 25–38 | 1.7 | 49.2 |
| 6 | 25 | 48 | 0.52 | 241 | — | 25–42 | 2.0 | 40.5 |
| 7 | 70 | 16 | 4.38 | 203 | 16 | 26–43 | 2.0 | 49.1 |
| 8 | 70 | 16 | 4.38 | 170 | 16 | 25–44 | 2.0 | 47.9 |
| 9 | 70 | 16 | 4.38 | 171 | 37 | 26–44 | 2.0 | 41.5 |
| 10 | 70 | 16 | 4.38 | 112 | — | 27–33 | 0.8 | 56.0 |
| 11 | 70 | 32 | 2.19 | 218 | — | 23–28 | 1.0 | 47.4 |
| 12 | 70 | 16 | 4.38 | 58 | — | 24 | 4.2 | 50.5 |

EXAMPLE 13

This example shows the reaction using ammonium hydroxide. A 100 ml. flask was charged with 50 ml. of dimethyl sulfoxide and 41 mmols of 28 percent ammonium hydroxide. A solution of 16 mmols of 3-chloro-1-nitropropane dissolved in 20 ml. of dimethyl sulfoxide was added dropwise over a 20 minute period. After standing with stirring at 32° C. for 30 minutes, analysis disclosed 80.7 percent conversion at a yield of 43.4 percent nitrocyclopropane. Further standing of the flask and contents with stirring at 31° C. for an additional hour resulted in an overall conversion of 95.2 percent and a yield of 45.8 percent nitrocyclopropane.

EXAMPLE 14

This example shows the reaction using triethylamine. A solution of 32 mmols of triethylamine in 50 ml. of dimethyl sulfoxide was made up in a 100 ml. flask. A solution of 16 mmols of 3-chloro-1-nitropropane was added dropwise to the flask with stirring and after the completion of the addition, the reactor was permitted to stand as stirring continued. A temperature of 60° ± 2° C. was maintained in the reactor. After a total elapsed time in the reactor of 90 minutes, the conversion was 71.1 percent at a yield of nitrocyclopropane of 35.2 percent. After an additional elapsed time of 3 hours and 10 minutes, the total conversion was 94.8 percent at a yield of nitrocyclopropane of 41.9 percent.

Nitrocyclopropane is produced when 3-chloro-1-nitropropane is reacted in like manner with anhydrous ammonia in dimethyl formamide as a solvent, in dimethyl acetamide as a solvent, in sulfolane as the solvent, in N-methyl pyrrolidone as the solvent, in methyl phenyl sulfoxide as the solvent, in hexamethylenephosphoramide as the solvent, and the like as the solvent.

It is to be understood that the above disclosure is by way of specific example and that numerous modifications and variations are available to those of ordinary skill in the art without departing from the true spirit and scope of our invention.

We claim:
1. A method for preparing nitrocyclopropane which comprises reacting 3-chloro-1-nitropropane with anhy- drous ammonia in a polar, aprotic solvent at a temperature between about 0° and 160° C.

2. A method in accordance with claim 1 in which the polar, aprotic solvent is a sulfoxide defined by the formula $R_1(R_2)S:O$ in which $R_1$ and $R_2$ are independently lower alkyl, phenyl or benzyl, or a chlorine substituted derivative thereof; a sulfone defined by the formula $R_3(R_4)SO_2$ in which $R_3$ and $R_4$ are independently selected from lower alkyl and can be joined together in a cyclic compound having from three to eight members in the ring, a di-N-substituted carboxylic acid amide defined by the formula $R_5CONR_6(R_7)$ in which $R_5$ is H or lower alkyl and $R_6$ and $R_7$ are independently lower alkyl; and N-lower alkyl alpha or beta pyrrolidone; hexamethylenephosphoramide or a mixture thereof.

3. A method for preparing nitrocyclopropane in accordance with claim 1 in which the polar, aprotic solvent is dimethyl sulfoxide, dimethylformamide, dimethylacetamide or sulfolane.

4. A method in accordance with claim 1 in which the volume ratio of the polar, aprotic solvent to the 3-chloro-1-nitropropane is between about 1:1 and about 100:1; the ratio of the polar, aprotic solvent in liters to the anhydrous ammonia in mols is between about 0.01:1 and about 30:1 and the molar ratio of the anhydrous ammonia to the 3-chloro-1-nitropropane is between about 0.5:1 and about 20:1.

5. A method in accordance with claim 1 in which the volume ratio of the polar, aprotic solvent to the 3-chloro-1-nitropropane is between about 5:1 and about 50:1; the ratio of the polar, aprotic solvent in liters to the anhydrous ammonia in mols is between about 0.1:1 and about 10:1 and the molar ratio of the anhydrous ammonia to the 3-chloro-1-nitropropane is between about 1:1 and about 10:1.

6. A method in accordance with claim 1 in which the temperature is between about 15° and about 145° C.

7. A method in accordance with claim 1 in which the temperature is between about 25° and about 125° C.

8. A method for preparing nitrocyclopropane which comprises reacting 3-chloro-1-nitropropane with anhydrous ammonia in a solvent selected from dimethyl sulfoxide, dimethylformamide, dimethylacetamide or sulfolane at a temperature between about 0° and about 160° C.

9. A method in accordance with claim 12 in which the solvent is dimethyl sulfoxide and the temperature is between about 15° and about 145° C.

* * * * *